United States Patent
Kulshreshtha et al.

(10) Patent No.: US 11,755,397 B2
(45) Date of Patent: Sep. 12, 2023

(54) SYSTEMS AND METHODS FOR PROCESSING OF MESSAGES SUBJECT TO DEAD LETTER QUEUES IN REPRESENTATIONAL STATE TRANSFER ARCHITECTURES TO PREVENT DATA LOSS IN CLOUD-BASED COMPUTING ENVIRONMENTS

(71) Applicant: Capital One Services, LLC, McLean, VA (US)

(72) Inventors: Shitij Kulshreshtha, McLean, VA (US); Daniel Leslie, McLean, VA (US); Ik Tae Kim, McLean, VA (US); Piyush Mohan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 62 days.

(21) Appl. No.: 17/407,635

(22) Filed: Aug. 20, 2021

(65) Prior Publication Data
US 2023/0054871 A1    Feb. 23, 2023

(51) Int. Cl.
*G06F 11/07* (2006.01)
*G06F 9/54* (2006.01)
*G06F 9/455* (2018.01)

(52) U.S. Cl.
CPC ........ *G06F 11/076* (2013.01); *G06F 9/45512* (2013.01); *G06F 9/542* (2013.01); *G06F 9/547* (2013.01); *G06F 11/0793* (2013.01)

(58) Field of Classification Search
CPC .............. G06F 11/076; G06F 11/0793; G06F 9/45512; G06F 9/542; G06F 9/547
See application file for complete search history.

(56) References Cited

U.S. PATENT DOCUMENTS

2019/0340059 A1* 11/2019 Bagarolo ................ G06F 8/71

FOREIGN PATENT DOCUMENTS

CN       108462750 A   *  8/2018

* cited by examiner

*Primary Examiner* — Matthew M Kim
*Assistant Examiner* — Kyle Emanuele
(74) *Attorney, Agent, or Firm* — Perkins Coie LLP (57) ABSTRACT

Systems and methods are provided for processing of messages subject to dead letter queues in representational state transfer ("REST") architectures to prevent data loss in cloud-based environments. For example, as opposed to conventional RESTful application programming interface ("API") approaches to handling message failures, the systems and methods provide a new system component to handle these failures. Specifically, instead of relying on a conventional dead letter queue (e.g., requiring a system to read the queue via lambda functions), the systems and methods create a representative system file based on any REST call in which a failure is detected.

18 Claims, 5 Drawing Sheets

```
{
"type": "record",
"name": "lmsEmailDeadLetterRecord",
"fields":[
{
"name": "retries",
"type": "int",
"description": "Number of retries"
},
{
"name": "payload",
"type": "string",
"description": "Payload sent to SDPv4 API as is"
}
]
}
```

SYSTEMS AND METHODS FOR PROCESSING OF MESSAGES SUBJECT TO DEAD LETTER QUEUES IN REPRESENTATIONAL STATE TRANSFER ARCHITECTURES TO PREVENT DATA LOSS IN CLOUD-BASED COMPUTING ENVIRONMENTS

BACKGROUND

Representational state transfer ("REST") is a software architectural style that was created to guide the design and development of the architecture for the World Wide Web. REST defines a set of constraints for how the architecture of an Internet-scale distributed hypermedia system, such as the Web, should behave. Web service application programming interfaces ("APIs") that adhere to the REST architectural constraints are called RESTful APIs. RESTful APIs may be used over nearly any protocol; when used for web APIs, REST typically takes advantage of Hypertext Transfer Protocol ("HTTP"). This means that developers have no need to install additional software or libraries when creating a RESTful API. Due to the complexity involved in facilitating message transmission through the RESTful API, conventional RESTful APIs use a messaging queue.

A conventional message queuing system is composed of a message broker program, which provides a publisher/subscriber interface for interacting with named message queues. A message queue is a store of published messages, which are consumed in sequential or prioritized order by one or more subscribers. For example, the message queue forms an asynchronous service-to-service communication in serverless and microservices architectures. While in the message queue, messages are stored until they are processed (e.g., one by one) and deleted. In some instances, however, a message may generate a failure response and be directed to a dead letter queue.

In message queueing, a dead letter queue is a service implementation to store messages that, for one or more reasons, generate a failure response. As a result of the failure, the message (e.g., an HTTP request) goes unfulfilled. By storing these messages in a dead letter queue, developers may look for common patterns and potential software problems. These dead letter queues are typically implemented as a component of the API; thus, as stated above, to apply REST to the API, developers have no need to install additional software or libraries.

SUMMARY

However, while the use of conventional dead letter queues for RESTful APIs are convenient and require no additional software or libraries, dead letter queues, when implemented in RESTful APIs, create a technical problem in certain instances. For example, messages are stored in the dead letter queue until they are processed; however, the dead letter queue itself may be a transitory form of storage in which system failures (e.g., resulting in the loss of data) may cause the messages in the dead letter queue to be lost. In such cases, any request (e.g., a REST call) upon which the message is based goes unresolved. In order to mitigate this situation, conventional systems may generate trigger events to alert the system of the presence of or number of messages in a dead letter queue. However, if a system requires a 100 percent response rate to REST calls (e.g., in order to meet system, governmental, and/or regulatory requirements), conventional dead letter queues fail to ensure compliance because while the system may be alerted to the presence of a message in a dead letter queue, the message may be subject to a system failure prior to being resolved.

Notably, this technical problem is even further exacerbated in cloud-based systems. For example, in cloud-based systems, one or more components of the overall system may be distributed over a network, and each of these one or more components may be operated by a different entity and be subject to one or more network and/or processing requirements. Disruptions in the resources of one or more of the components of the cloud-based system may result in slowdowns, data errors, data loss, and/or system failures. In such instances, messages in dead letter queues may be corrupted or lost.

In light of the problems above, systems and methods are described herein for processing of messages subject to dead letter queues in REST architectures to prevent data loss in cloud-based environments. For example, as opposed to conventional RESTful API approaches to handling message failures, the systems and methods provide a new system component to handle these failures. Specifically, instead of relying on a conventional dead letter queue (e.g., requiring a system to read the queue via lambda functions), the systems and methods create a representative system file based on any REST call in which a failure is detected. The processing of the representative system file does not therefore require a system to read the queue via lambda functions. Moreover, the system stores these representative system files in dedicated memory in order to ensure that no messages are lost (e.g., due to a system crash) as opposed to the transitory nature of conventional dead letter queue operations.

For example, while such an approach would not be possible in many protocols, the system may rely on the information in a REST call to generate a sufficient account of the information in the REST call. For example, REST calls are stateless in that relevant session data is sent to a receiver in such a manner that every packet of information transferred may be processed in isolation. As such, the representative system file may reflect this information and may allow for independent processing and resolution of any message failure, without the storage of the original message.

The creation of representative system files and the use of dedicated storage creates numerous technical advantages. For example, the system may immediately and automatically create a representative system file upon detection of a message failure (e.g., bypassing a conventional dead letter queue). By doing so, the system may ensure a 100 percent response rate to message failures. In response to determining the failure response for the REST call based on processing the representative system file, the system may transmit the failure response and/or delete the representative system file from the dedicated memory. For example, the system may store the representative system file in the dedicated memory until the failure is resolved. As such, the system may ensure that all failures are responded to and/or processed. As another example, the representative system file may be retrieved from the dedicated memory based on a configuration file that specifies shell commands to run periodically on a given schedule without a threat of data loss. As another example, the system may receive a user input indicating a frequency at which to process the representative system file. The system may then determine to process the representative system file at that frequency without a threat of data loss.

In some aspects, systems and methods are described for improved processing of messages subject to dead letter queues in REST architecture through dynamic file creation without a need for independent storage of the messages. For example, the system may receive a REST call. The system may compare the REST call to a system parameter. The system may determine a failure of the REST call based on comparing the REST call to the system parameter. The system may generate a representative system file based on the REST call in response to determining the failure, wherein the representative system file includes a characteristic of the REST call. The system may store the representative system file in dedicated memory. The system may retrieve the representative system file from the dedicated memory. The system may process the representative system file. The system may determine a failure response for the REST call based on processing the representative system file.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
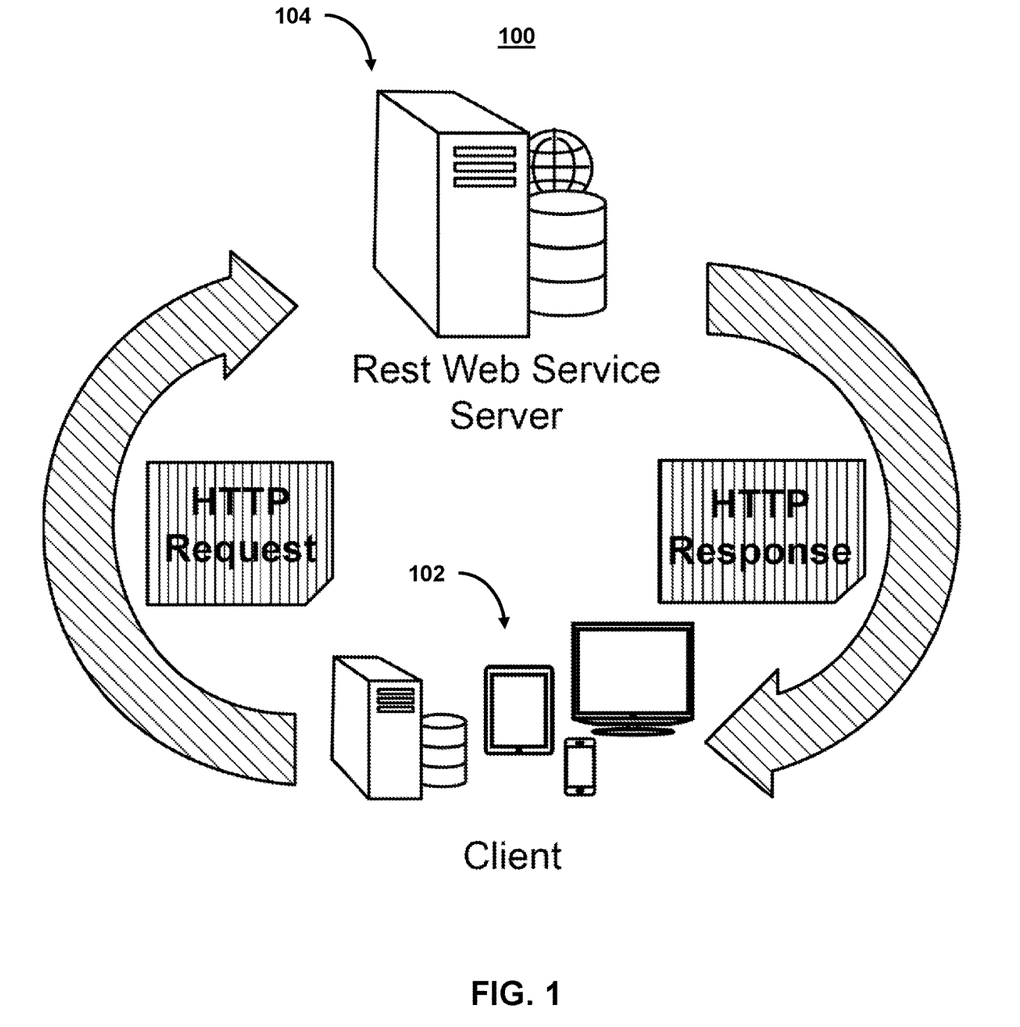
FIG. 1 shows an illustrative system environment for the exchange of HTTP requests and responses in accordance with one or more embodiments.

FIG. 1 shows an illustrative system environment for the exchange of HTTP requests and responses in accordance with one or more embodiments. For example, as shown in FIG. 1, client devices 102 may issue HTTP requests to server 104. In response, server 104 may issue HTTP responses. HTTP is an application-layer protocol for transmitting hypermedia documents, such as HyperText Markup Language ("HTML"). Client devices 102 and server 104 may operate in a client-server model in which a distributed application structure partitions tasks or workloads between the providers of a resource or service, called servers, and service requesters, called clients.

As further shown in FIG. 1, server 104 may feature a REST architecture. For example, the REST architecture defines a set of constraints for how the architecture of an Internet-scale distributed hypermedia system, such as the Web, should behave. Beneficially, the REST architectural style improves (e.g., over conventional architecture) the scalability of interactions between components, uniform interfaces, independent deployment of components, and the creation of a layered architecture to facilitate caching components to reduce user-perceived latency, enforce security, and encapsulate legacy systems. REST has been employed throughout the software industry and is a widely accepted set of guidelines for creating stateless, reliable web services.

For example, server 104, based on the REST architecture, may restrict the ways that the server can process and respond to client requests so that, by operating within these constraints, the system gains desirable non-functional properties, such as performance, scalability, simplicity, modifiability, visibility, portability, and reliability. A message or request (e.g., a REST call) generally consists of an HTTP verb, which defines what kind of operation to perform, and a header, which allows the client to pass along information about the request.

In many instances, RESTful APIs are stateless (e.g., calls may be processed independently of one another, and each call contains all of the data necessary to complete itself successfully). A RESTful API should not rely on data being stored on the server or in sessions to determine what to do with a call, but rather should solely rely on the data that is provided in that call itself. As such, a representative system file may be created based on a REST call that includes the necessary information for processing and/or determining why a REST call failed. For example, each REST call has the necessary data in itself, such as the API key, access token, user ID, etc. For example, as described below, in some embodiments, the system may generate a representative system file based on a REST call.

In some embodiments, server 104 may need to maintain a 100 percent response rate to REST calls. For example, server 104 may be required by either governmental, regulatory, or client demands to ensure that all REST calls are responded to. However, some REST calls may meet with failure. In such cases, conventional systems may generate a dead letter queue. The dead letter queue is a service implementation to store messages that meet one or more of the following criteria: a message is sent to a queue that does not exist; a message is sent to a queue in which the queue length limit is exceeded; a message exceeds a message length limit; a message is rejected by another queue exchange; a message reaches a threshold read counter number, because it is not consumed; or a message expires due to per-message time to live.

Figure 2:
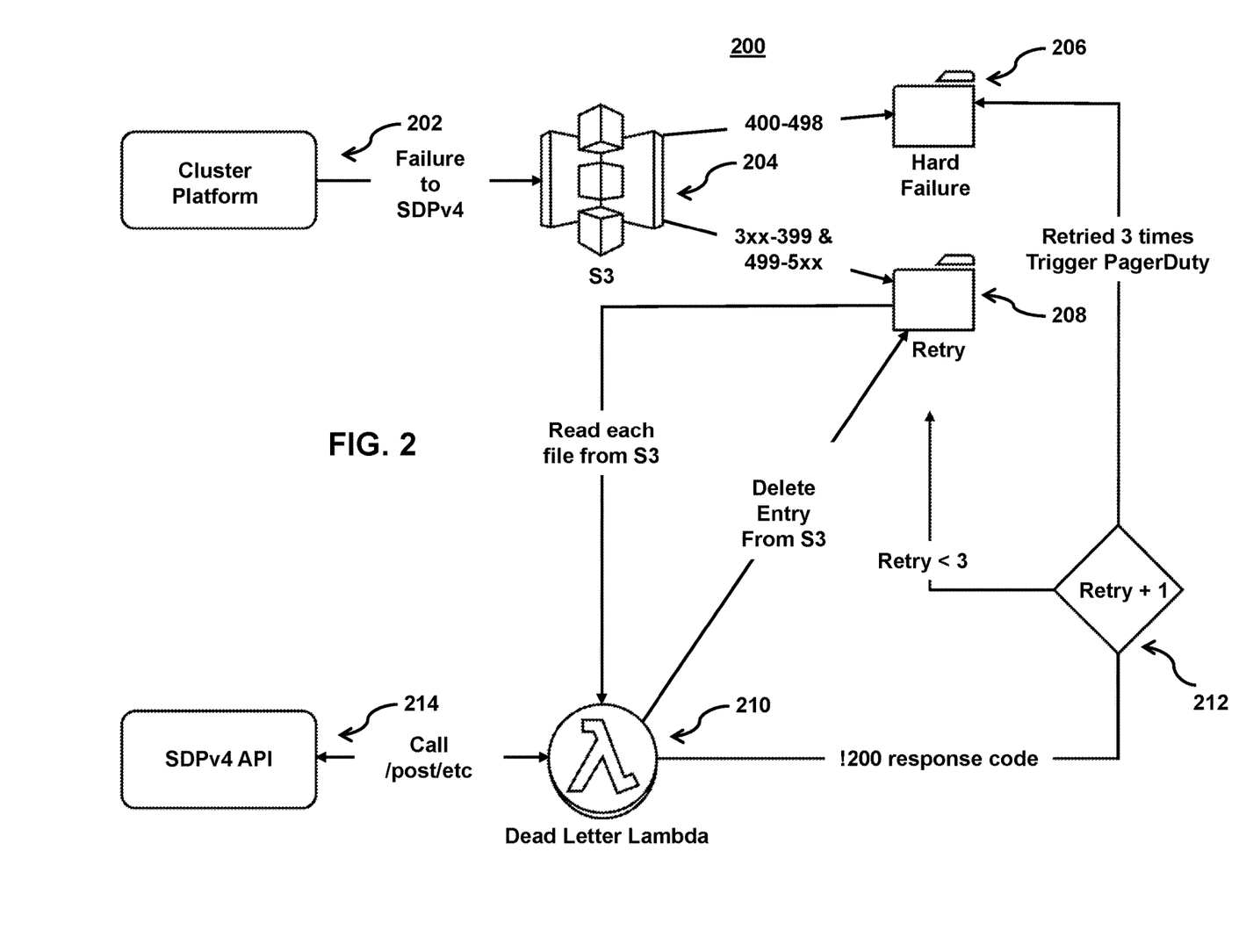
FIG. 2 shows an illustrative architecture for processing of messages subject to dead letter queues in accordance with one or more embodiments.

FIG. 2 shows an illustrative architecture for processing of messages subject to dead letter queues in accordance with one or more embodiments. For example, system 200 may be used to process messages subject to dead letter queues in REST architecture through dynamic file creation without a need for independent storage of the messages, in accordance with one or more embodiments.

System 200 includes cluster platform 202. Cluster platform 202 may comprise multiple servers and/or computing devices that are grouped together to achieve one or more services. Cluster platform 202 may comprise parallel systems having multiple servers and/or computing devices. Cluster platform 202 may also include a combination of hardware clusters and software clusters. The hardware clusters may share the use of high-performance disks between the systems. The software clusters may allow the systems to function in concert. Cluster platform 202 may also generate and/or process one or more HTTP calls (e.g., REST calls). In some instances, a REST call may result in a failure. In response, the system may immediately and/or automatically create a representative system file upon detection of a message failure (e.g., bypassing a conventional dead letter queue). The representative system file may include a representation of the message resulting in the failure. For example, the representative system file may include relevant session data that was sent as part of the message (e.g., the REST call) such that the packets of information representing the original message are stored and may be processed in isolation (e.g., without the original message).

The representative system file may be stored at cloud storage 204. For example, the system may store the representative system file in dedicated memory. In some embodiments, the dedicated memory may comprise a dedicated cloud that features a single-tenant cloud infrastructure of a dedicated server. For example, a dedicated server is a type of remoter server in a network that is dedicated to a single user, organization, or application. Unlike dedicated clouds, dedicated servers may be entirely controlled by the service provider, at which a type of failure is determined. In some embodiments, the original REST call (e.g., which may conventionally be stored in a traditional dead letter queue) is deleted.

The failure of the REST call may correspond to an error code, which is stored with the representative system file. For example, when a client (e.g., cluster platform 202) makes a request to an HTTP server—and the server successfully receives the request—the server must notify the client whether the request was successfully handled or not. HTTP accomplishes this with five categories of status codes: 100-level (Informational)—server acknowledges a request; 200-level (Success)—server completed the request as expected; 300-level (Redirection)—client needs to perform further actions to complete the request; 400-level (Client error)—client sent an invalid request; and/or 500-level (Server error)—server failed to fulfill a valid request due to an error with server. Based on the response code, the system may surmise the result of a particular request.

The system may determine the type of failure (e.g., based on the error code) and process the representative file system based on the type. In some embodiments, the representative system file is processed using a serverless compute service that runs code without managing servers, creating workload-aware cluster scaling logic, maintaining event integrations, or managing runtimes. For example, the system may input the representative system file into a workflow in order to resolve the failure. The workflow may be an automated workflow, although in some instances, manual actions and/or review may be undertaken. For example, the workflow may represent a hierarchical framework of steps, functions, and/or approvals through which a message is processed.

For example, the system may determine whether the failure corresponds to a first failure type (e.g., a first subset of error codes) or a second failure type (e.g., a second subset of error codes) based upon a system parameter type of the system parameter to which the REST call was compared (e.g., the first failure type may require manual review and/or the second failure type may not require manual review). As shown in FIG. 2, a first failure type may result in the detection of a hard failure, which requires manual review at processing point 206. In contrast, a second failure type may result in the detection of a soft failure type, which may be resolved automatically at processing point 208. For example, the representative system file that is processed via processing point 208 may be transmitted to a dead letter queue created for processing the representative system file (e.g., queue 210).

Notably, queue 210 does not need to be built on a system that can read conventional dead letter queues (e.g., via lambda functions). Instead of a conventional queue, queue 210 may use native functions to process the representative system file. For example, because there is no need to maintain a conventional dead letter queue (e.g., based on lambda functions), the representative system file does not need to be reformatted and/or otherwise modified in order to be processed by queue 210. For example, the system ensures that messages subject to dead letter queues in REST architecture are stored and processed (e.g., preventing data loss in cloud-based computing environments) through dynamic file creation of representative system files without a need for independent storage of the messages in a conventional dead letter queue (e.g., a queue based on lambda functions).

At queue 210, the representative system file may be reread and/or resolved via processing point 214. At queue 210, the representative system file may be retried at processing point 212. For example, the system may try to reprocess the REST call to determine the underlying cause of the failure (which may in some cases be a random failure that cannot be reproduced). Once a cause is found (or the failure is identified to be caused randomly), the system may reprocess the REST call based on the representative system file, modifying the representative system file. The system may then proceed to the next representative system file in queue 210. The system may also perform an additional step of determining that all failures have been processed and write a status update to a status logger.

Additionally or alternatively, system 200 may modify the representative system file in order to generate a modified REST call for subsequent processing. The system may retrieve a lookup table database listing a predetermined number of attempts for a given modification. The system may compare the modification type to the database to determine a number of attempts. Additionally or alternatively, the system may retrieve a lookup table database listing one or more response codes for resolving a failure and/or modifying a REST call.

In some embodiments, in response to determining that the failure corresponds to the first failure type, the system may determine to generate the representative system file based on the REST call. In response to determining that the failure corresponds to the second failure type, the system may determine not to generate the representative system file based on the REST call. For example, in order to reduce overall resource demands on the system, the system may generate the representative system file only in response to a particular file type (e.g., a failure type resulting in a soft failure).

Figure 3:
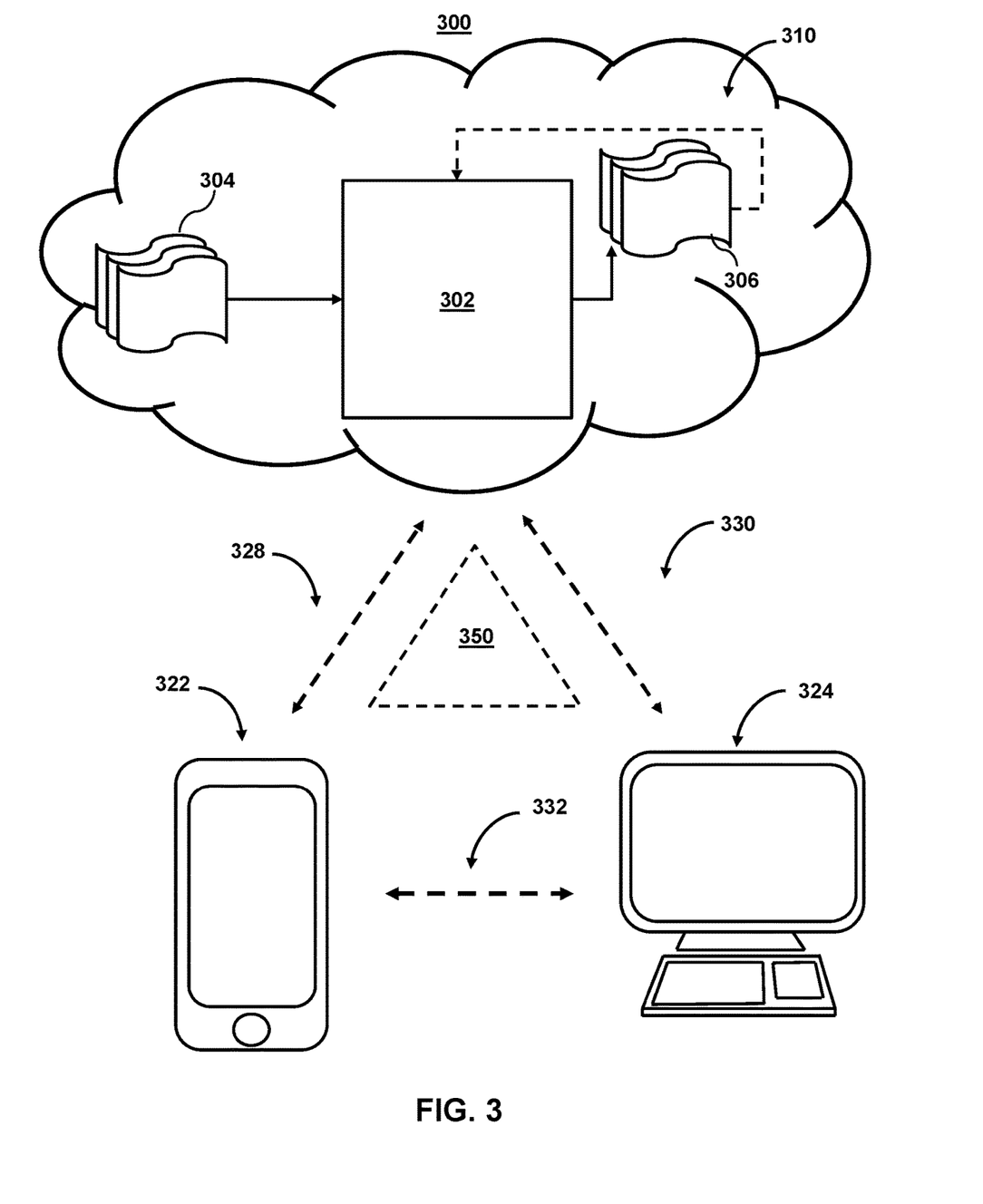
FIG. 3 shows illustrative system components for processing of messages subject to dead letter queues in accordance with one or more embodiments.

FIG. 3 shows illustrative system components for processing of messages subject to dead letter queues in accordance with one or more embodiments. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and/or other computing equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, if mobile device 322 and user terminal 324 are touchscreen devices, these displays also act as user input interfaces. It should be noted that in some embodiments, the devices may have neither user input interfaces nor displays and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model. Model 302 may take inputs 304 and provide outputs 306. The inputs may include multiple datasets, such as a training dataset and a test dataset. Each of the plurality of datasets (e.g., inputs 304) may include data subsets related to REST calls, failure types, and/or resolutions of those failure types. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction. For example, model 302 may be trained to identify failure types and/or resolutions of those failure types. For example, the trained model 302 may then determine a proper modification (and recommend particular response codes, a number of retry attempts, and/or a frequency of processing).

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function that the signal must surpass before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a failure type).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions for a given REST call. The output of the model (e.g., model 302) may include characteristics of a response type.

System 300 also includes API layer 350. In some embodiments, API layer 350 may be implemented on mobile device 322 or user terminal 324. Alternatively, or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of their operations and the data types used to exchange information. RESTful APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources such as Service Repository and Developer Portal, but with low governance, standardization, and separation of concerns. Alternatively, system 300 may be fully based on API layer 350, such that separation of concerns between layers such as API layer 350, services, and applications are in place.

In some embodiments, the system architecture may use a microservice approach. Such systems may use two types of layers: front-end layers and back-end layers, where microservices reside. In this kind of architecture, the role of the API layer 350 may be to provide integration between front-end layers and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
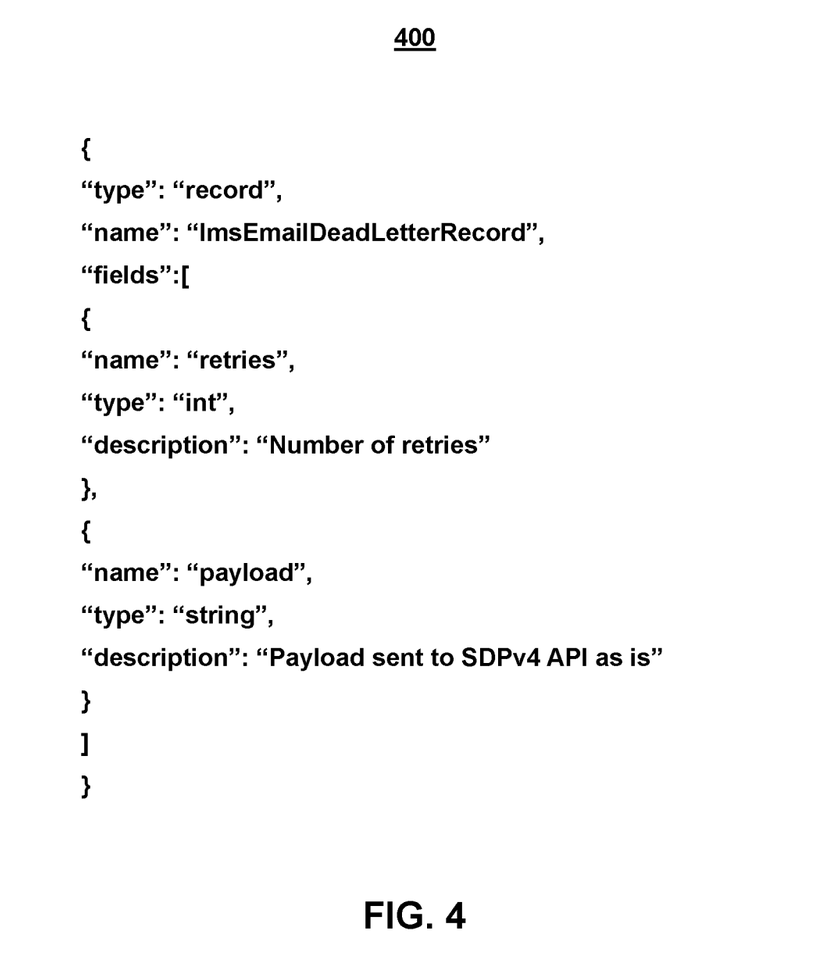
FIG. 4 shows illustrative pseudocode for processing of messages subject to dead letter queues in accordance with one or more embodiments.

FIG. 4 shows illustrative pseudocode for processing of messages subject to dead letter queues in accordance with one or more embodiments. For example, pseudocode 400 may include an example of a portion of lines of code that may be used for improved processing of messages subject to dead letter queues in REST architecture through dynamic file creation without a need for independent storage of the messages. For example, based on pseudocode 400, the system may receive a REST call. The system may then, based on pseudocode 400, compare the REST call to a system parameter. Based on pseudocode 400, the system may determine a failure of the REST call based on comparing the REST call to the system parameter. The system may generate, based on pseudocode 400, a representative system file based on the REST call in response to determining the failure, wherein the representative system file includes a characteristic of the REST call. The system may store, based on pseudocode 400, the representative system file in dedicated memory. The system may retrieve, based on pseudocode 400, the representative system file from the dedicated memory. The system may process, based on pseudocode 400, the representative system file. The system may determine, based on pseudocode 400, a failure response for the REST call based on processing the representative system file.

For example, by using a REST architecture, the system allows for any information to be a resource: a document or image, a temporal service, a collection of other resources, or a non-virtual object (e.g., a person). REST uses a resource identifier to identify the particular resource involved in an interaction between components. For example, a resource identifier may be used to determine whether or not a particular system parameter is met. The system may also use a resource representation and call upon the resource representation as needed. The state of the resource at any particular timestamp is known as resource representation. A representation consists of data, metadata describing the data, and hypermedia links that can help the clients in transition to the next desired state.

Figure 5:
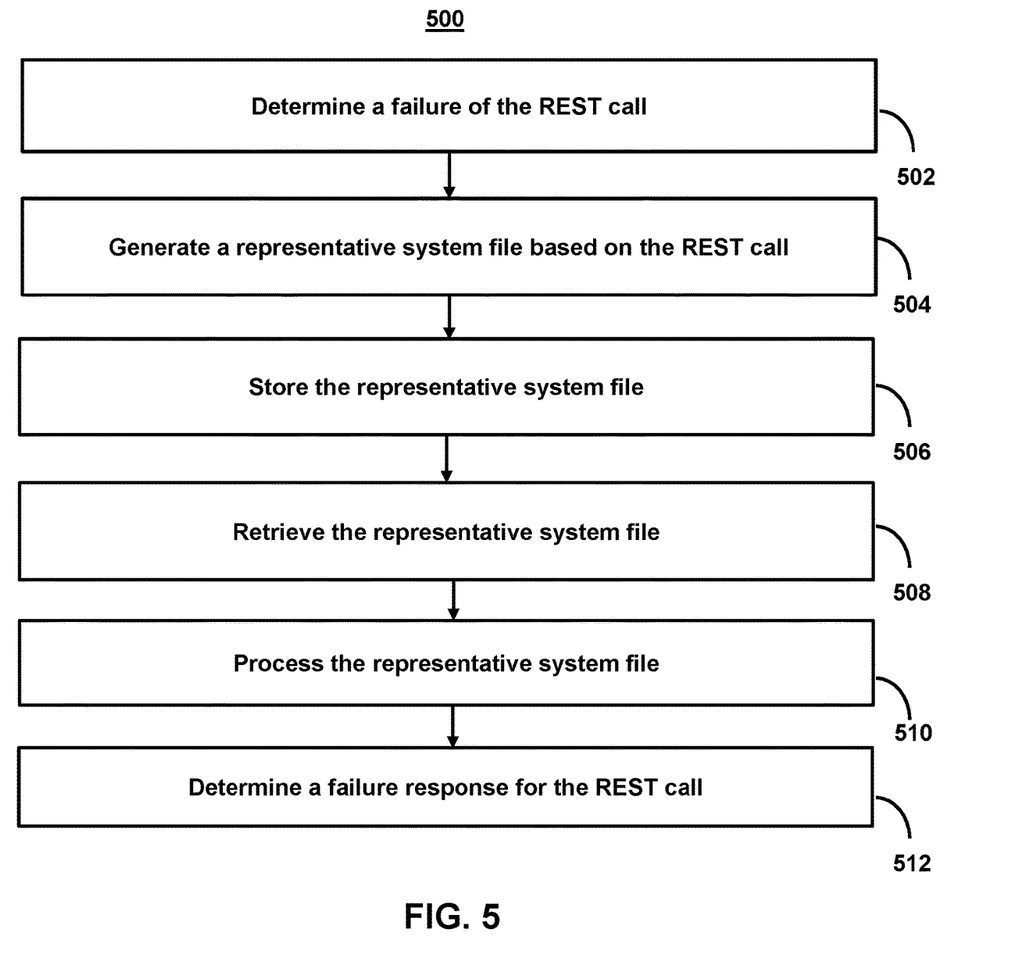
FIG. 5 shows a flowchart of the steps involved in processing of messages subject to dead letter queues in REST architecture through dynamic file creation without a need for independent storage of the messages, in accordance with one or more embodiments.

FIG. 5 shows a flowchart of the steps involved in processing of messages subject to dead letter queues in REST architecture through dynamic file creation without a need for independent storage of the messages, in accordance with one or more embodiments.

At step 502, process 500 (e.g., using one or more components described in system 300 (FIG. 3)) determines a failure of the REST call. For example, the system may receive a REST call. The system may then compare the REST call to a system parameter. The system may then determine a failure of the REST call based on comparing the REST call to the system parameter.

For example, the system may use one or more system parameters to determine whether or not a failure has occurred. In some embodiments, the system parameter may be selected based on an application and/or an entity from which the REST call was received. For example, the system may use specific system parameters for specific applications and/or or entities in order to more quickly and/or efficiently process the REST call. By more quickly and/or efficiently processing the REST call, the system may reduce the system resources required for processing as well as increase the throughput speed of the system.

In some embodiments, the system may determine that a queue to which the REST call is directed does not correspond to the system parameter. For example, the system parameter may correspond to a known system queue, and a message may be sent to a queue that does not exist. As an example, the system may receive a message. The system may retrieve metadata indicating a destination queue. The system may retrieve a database directory listing available queues and/or queues available for the receipt by the sending entity (e.g., based on security authorization). The system may compare the metadata (e.g., a sender identifier) to the database directory to determine whether or not the queue exists and/or is accessible. If not, the system may trigger a failure.

Additionally or alternatively, the system may determine that a length of the queue to which the REST call is directed exceeds the system parameter. For example, the system parameter may correspond to a queue length limit. As an example, the system may set a maximum queue length for a queue to which the REST call is directed. The system may set this queue length in order to avoid denial of service attacks such as flood attacks. Flood attacks occur when the system receives too much traffic for the server to buffer, causing the system to slow down and eventually stop. For example, while the unconventional architecture described herein allows for virtually unlimited queue length (since representative files may be stored elsewhere), the system may nonetheless establish a queue length limit in order to prevent server slowdown or other negative effects of cyber-attacks.

Additionally or alternatively, the system may determine that the REST call is expired based on the system parameter. For example, the system parameter may be a per-message time to live ("TTL"). As an example, the system may receive a message. The system may retrieve metadata indicating a TTL. The message TTL may be set for a given queue by setting the message-TTL argument with a policy or by specifying the same argument at the time of queue declaration. In such cases, a message that has been in the queue for longer than the configured TTL may be determined to be dead. In some embodiments, the system may have TTL set based on application and/or entity, each with a specified TTL. For example, a message routed to multiple queues may die at different times, or not at all, in each queue in which it resides. Furthermore, the death of a message in one queue may have no impact on the life of the same message in other queues (e.g., depending on system settings and/or any other system parameter).

Additionally or alternatively, the system may determine that a message length of the REST call exceeds the system parameter. For example, the system parameter may be a message length limit. As an example, the system may receive a message. The system may retrieve metadata indicating a destination queue. The system may retrieve a database directory listing message length limits for the destination queue. The system may compare the metadata to the database directory to determine whether or not the message length is exceeded. If it is, the system may trigger a failure.

In some embodiments, the system may further determine a specific type of failure that has occurred. The system may determine whether or not a representative file should be generated based on the failure type. For example, if the failure type corresponds to a failure type requiring manual review, the system may direct the REST call to a manual review queue. If the failure type corresponds to a failure type that may be automatically processed, the system may generate a representative file for the REST call.

For example, the system may determine whether the failure corresponds to a first failure type or a second failure type based upon a system parameter type of the system parameter to which the REST call was compared (e.g., the first failure type may require manual review and/or the second failure type may not require manual review). In response to determining that the failure corresponds to the first failure type, the system may determine to generate the representative system file based on the REST call. In response to determining that the failure corresponds to the second failure type, the system may determine not to generate the representative system file based on the REST call.

At step 504, process 500 (e.g., using one or more components described in system 300 (FIG. 3)) generates a representative system file based on the REST call. For example, the system may generate a representative system file based on the REST call in response to determining the failure. Additionally, the representative system file may include a characteristic of the REST call.

At step 506, process 500 (e.g., using one or more components described in system 300 (FIG. 3)) stores the representative system file. For example, the system may store the representative system file in dedicated memory. In some embodiments, the dedicated memory may comprise a dedicated cloud that features a single-tenant cloud infrastructure of a dedicated server. For example, a dedicated server is a type of remote server in a network that is dedicated to a single user, organization, or application. Unlike dedicated clouds, dedicated servers may be entirely controlled by the service provider.

At step 508, process 500 (e.g., using one or more components described in system 300 (FIG. 3)) retrieves the representative system file. For example, the system may retrieve the representative system file from the dedicated memory. The representative system file may be retrieved from the dedicated memory based on a configuration file that specifies shell commands to run periodically on a given schedule.

At step 510, process 500 (e.g., using one or more components described in system 300 (FIG. 3)) processes the representative system file. In some embodiments, the representative system file is processed using a serverless compute service that runs code without managing servers, creating workload-aware cluster scaling logic, maintaining event integrations, or managing runtimes. For example, the system may input the representative system file into a workflow in order to resolve the failure. The workflow may be an automated workflow, although in some instances, manual actions and/or review may be undertaken. For example, the workflow may represent a hierarchical framework of steps, functions, and/or approvals through which a message is processed.

Additionally or alternatively, the system may modify a REST call based on the failure response. For example, in response to processing the representative system file, the system may detect an error and/or characteristic of the REST call that triggered the failure. The system may adjust the characteristic, creating a modified REST call that may be successfully processed. For example, the system may generate a modified REST call based on the failure response. The system may then transmit the modified REST call.

Additionally or alternatively, the system may attempt to process the modified REST call a predetermined number of times. For example, the system may determine a number of attempts based on the modification type of a modification. As an example, the system may determine a modification to the REST call. The system may retrieve a lookup table database listing a predetermined number of attempts for a given modification. The system may compare the modification type to the database to determine a number of attempts.

Additionally or alternatively, the number of attempts may be based on a failure type. For example, different failure types may have different system settings indicating a frequency of processing, a number of attempts, etc. In such cases, the system may determine a number of attempts for processing the modified REST call based on a response time for addressing failures of a first failure type. The system may then process the modified REST call based on the number of attempts. As an example, the system may determine a failure type of the REST call. The system may retrieve a lookup table database listing a predetermined number of attempts for a given failure type. The system may compare the failure type to the database to determine a number of attempts.

In some embodiments, the system may ensure that a REST call is responded to even if a certain number of attempts to reprocess (or reprocess a modified REST call) is unsuccessful. For example, the system may determine that the modified REST call has been processed the predetermined number of attempts. In response to determining that the modified REST call has been processed the predetermined number of attempts, the system may determine that the failure corresponds to the first failure type, wherein the first failure type requires manual review.

In some embodiments, the system may be processed at a desired frequency. Furthermore, the frequency may be set manually (e.g., by a user) or may be triggered based on one or more events. For example, because the representative system file is stored in dedicated memory, there is no risk to loss of data and/or a queue exceeding an allowable size. However, the system may wish to ensure that failures are addressed within a specific amount of time. For example, the system may receive a user input indicating a frequency at which to process the representative system file. The system may then determine to process the representative system file at the indicated frequency.

At step 512, process 500 (e.g., using one or more components described in system 300 (FIG. 3)) determines a failure response for the REST call. For example, the system may determine a failure response for the REST call based on processing the representative system file. The system may additionally take subsequent steps. For example, in response to determining the failure response for the REST call based on processing the representative system file, the system may transmit the failure response and/or delete the representative system file from the dedicated memory. For example, the system may store the representative system file in the dedicated memory until the failure is resolved. As such, the system may ensure that all failures are responded to and/or processed.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a REST call; comparing the REST call to a system parameter; determining a failure of the REST call based on comparing the REST call to the system parameter; in response to determining the failure, generating a representative system file based on the REST call, wherein the representative system file includes a characteristic of the REST call; storing the representative system file in dedicated memory; retrieving the representative system file from the dedicated memory; processing the representative system file; and determining a failure response for the REST call based on processing the representative system file.

2. The method of any one of the preceding embodiments, wherein determining the failure of the REST call based on comparing the REST call to the system parameter comprises: determining that a queue to which the REST call is directed does not correspond to the system parameter, wherein the system parameter corresponds to a known system queue; determining that a length of the queue to which the REST call is directed exceeds the system parameter, wherein the system parameter is a queue length limit;

determining that the REST call is expired based on the system parameter, wherein the system parameter is a per-message time to live; or determining that a message length of the REST call exceeds the system parameter, wherein the system parameter is a message length limit.

3. The method of any one of the preceding embodiments, further comprising: determining whether the failure corresponds to a first failure type or a second failure type based upon a system parameter type of the system parameter to which the REST call was compared, wherein the first failure type requires manual review, and wherein the second failure type does not require manual review; in response to determining that the failure corresponds to the first failure type, determining to generate the representative system file based on the REST call; and in response to determining that the failure corresponds to the second failure type, determining not to generate the representative system file based on the REST call.

4. The method of any one of the preceding embodiments, further comprising: in response to determining the failure response for the REST call based on processing the representative system file, transmitting the failure response; and deleting the representative system file from the dedicated memory.

5. The method of any one of the preceding embodiments, further comprising: receiving a user input indicating a frequency at which to process the representative system file; and determining to process the representative system file at the indicated frequency.

6. The method of any one of the preceding embodiments, further comprising: generating a modified REST call based on the failure response; and transmitting the modified REST call.

7. The method of any one of the preceding embodiments, further comprising: determining a number of attempts for processing the modified REST call based on a response time for addressing failures of a first failure type; and processing the modified REST call based on the determined number of attempts.

8. The method of any one of the preceding embodiments, further comprising: determining that the modified REST call has been processed the determined number of attempts; and in response to determining that the modified REST call has been processed the determined number of attempts, determining that the failure corresponds to the first failure type, wherein the first failure type requires manual review.

9. The method of any one of the preceding embodiments, wherein the representative system file is processed using a serverless compute service that runs code without managing servers, creating workload-aware cluster scaling logic, maintaining event integrations, or managing runtimes.

10. The method of any one of the preceding embodiments, wherein the representative system file is retrieved from the dedicated memory based on a configuration file that specifies shell commands to run periodically on a given schedule.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

We claim:

1. A system for improved processing of messages subject to dead letter queues in representational state transfer ("REST") architecture to prevent data loss in cloud-based computing environments through dynamic file creation without a need for independent storage of the messages, the system comprising:
   cloud-based dedicated memory; and
   cloud-based control circuitry configured to:
      receive a REST call;
      compare the REST call to a system parameter;
      determine a failure of the REST call based on comparing the REST call to the system parameter;
      determine whether the failure corresponds to a first failure type or a second failure type based upon a system parameter type of the system parameter to which the REST call was compared, wherein the first failure type requires manual review, and wherein the second failure type does not require manual review;
      determine to generate a representative system file based on the REST call in response to determining that the failure corresponds to the first failure type; and
      determine not to generate the representative system file based on the REST call in response to determining that the failure corresponds to the second failure type;
      generate the representative system file based on the REST call in response to determining the failure, wherein the representative system file includes a characteristic of the REST call;
      store the representative system file in the dedicated memory;
      retrieve the representative system file from the dedicated memory, wherein the representative system file is retrieved from the dedicated memory based on a configuration file that specifies shell commands to run periodically on a given schedule;
      process the representative system file, wherein the representative system file is processed using a serverless compute service that runs code without managing servers, creating workload-aware cluster scaling logic, maintaining event integrations, or managing runtimes;
      determine a failure response for the REST call based on processing the representative system file;
      generate a modified REST call based on the failure response;
      transmit the modified REST call;
      transmit the failure response in response to determining the failure response for the REST call based on processing the representative system file; and
      delete the representative system file from the dedicated memory.

2. A method for improved processing of messages subject to dead letter queues in representational state transfer ("REST") architecture through dynamic file creation without a need for independent storage of the messages, the method comprising:
   receiving a REST call;
   comparing the REST call to a system parameter;
   determining a failure of the REST call based on comparing the REST call to the system parameter;
   in response to determining the failure, generating a representative system file based on the REST call, wherein the representative system file includes a characteristic of the REST call;
   storing the representative system file in dedicated memory;

retrieving the representative system file from the dedicated memory;
processing the representative system file, wherein processing the representative system file comprises using a serverless compute service that runs code without managing servers, creating workload-aware cluster scaling logic, maintaining event integrations, or managing runtimes;
determining a failure response for the REST call based on processing the representative system file;
generating a modified REST call based on the failure response; and
transmitting the modified REST call.

3. The method of claim 2, wherein determining the failure of the REST call based on comparing the REST call to the system parameter comprises:
determining that a queue to which the REST call is directed does not correspond to the system parameter, wherein the system parameter corresponds to a known system queue;
determining that a length of the queue to which the REST call is directed exceeds the system parameter, wherein the system parameter is a queue length limit;
determining that the REST call is expired based on the system parameter, wherein the system parameter is a per-message time to live; or
determining that a message length of the REST call exceeds the system parameter, wherein the system parameter is a message length limit.

4. The method of claim 2, further comprising:
determining whether the failure corresponds to a first failure type or a second failure type based upon a system parameter type of the system parameter to which the REST call was compared, wherein the first failure type requires manual review, and wherein the second failure type does not require manual review;
in response to determining that the failure corresponds to the first failure type, determining to generate the representative system file based on the REST call; and
in response to determining that the failure corresponds to the second failure type, determining not to generate the representative system file based on the REST call.

5. The method of claim 2, further comprising:
in response to determining the failure response for the REST call based on processing the representative system file, transmitting the failure response; and
deleting the representative system file from the dedicated memory.

6. The method of claim 2, further comprising:
receiving a user input indicating a frequency at which to process the representative system file; and
determining to process the representative system file at the frequency.

7. The method of claim 2, further comprising:
determining a number of attempts for processing the modified REST call based on a response time for addressing failures of a first failure type; and
processing the modified REST call based on the number of attempts.

8. The method of claim 7, further comprising:
determining that the modified REST call has been processed the number of attempts; and
in response to determining that the modified REST call has been processed the determined number of attempts, determining that the failure corresponds to the first failure type, wherein the first failure type requires manual review.

9. The method of claim 2, wherein the representative system file is processed using a serverless compute service that runs code without managing servers, creating workload-aware cluster scaling logic, maintaining event integrations, or managing runtimes.

10. The method of claim 2, wherein the representative system file is retrieved from the dedicated memory based on a configuration file that specifies shell commands to run periodically on a given schedule.

11. A non-transitory, computer-readable medium for improved processing of messages subject to dead letter queues in representational state transfer ("REST") architecture through dynamic file creation without a need for independent storage of the messages, comprising instructions that, when executed by one or more processors, cause operations comprising:
determining a failure of a REST call based on comparing the REST call to a system parameter;
generating a representative system file based on the REST call in response to determining the failure, wherein the representative system file includes a characteristic of the REST call;
storing the representative system file in dedicated memory;
retrieving the representative system file from the dedicated memory, wherein the representative system file is retrieved from the dedicated memory based on a configuration file that specifies shell commands to run periodically on a given schedule;
processing the representative system file, wherein the representative system file is processed using a serverless compute service that runs code without managing servers, creating workload-aware cluster scaling logic, maintaining event integrations, or managing runtimes;
determining a failure response for the REST call based on processing the representative system file;
generating a modified REST call based on the failure response; and
transmitting the modified REST call.

12. The non-transitory, computer-readable medium of claim 11, wherein determining the failure of the REST call based on comparing the REST call to the system parameter comprises:
determining that a queue to which the REST call is directed does not correspond to the system parameter, wherein the system parameter corresponds to a known system queue;
determining that a length of the queue to which the REST call is directed exceeds the system parameter, wherein the system parameter is a queue length limit;
determining that the REST call is expired based on the system parameter, wherein the system parameter is a per-message time to live; or
determining that a message length of the REST call exceeds the system parameter, wherein the system parameter is a message length limit.

13. The non-transitory, computer-readable medium of claim 11, wherein the instructions further cause operations comprising:
determining whether the failure corresponds to a first failure type or a second failure type based upon a system parameter type of the system parameter to which the REST call was compared, wherein the first failure type requires manual review, and wherein the second failure type does not require manual review;

in response to determining that the failure corresponds to the first failure type, determining to generate the representative system file based on the REST call; and in response to determining that the failure corresponds to the second failure type, determining not to generate the representative system file based on the REST call.

14. The non-transitory, computer-readable medium of claim 11, wherein the instructions further cause operations comprising:
 in response to determining the failure response for the REST call based on processing the representative system file, transmitting the failure response; and
 deleting the representative system file from the dedicated memory.

15. The non-transitory, computer-readable medium of claim 11, further comprising:
 receiving a user input indicating a frequency at which to process the representative system file; and
 determining to process the representative system file at the frequency.

16. The non-transitory, computer-readable medium of claim 11, wherein the instructions further cause operations comprising:

determining a number of attempts for processing the modified REST call based on a response time for addressing failures of a first failure type; and processing the modified REST call based on the number of attempts.

17. The non-transitory, computer-readable medium of claim 16, wherein the instructions further cause operations comprising:
 determining that the modified REST call has been processed the number of attempts; and
 in response to determining that the modified REST call has been processed the number of attempts, determining that the failure corresponds to the first failure type, wherein the first failure type requires manual review.

18. The non-transitory, computer-readable medium of claim 11, wherein the instructions further cause operations comprising:
 receiving the REST call; and
 comparing the REST call to the system parameter.

\* \* \* \* \*